United States Patent

[11] 3,598,261

| [72] | Inventor | Leroy A. Anderson<br>1417 E. Belleview St., Phoenix, Ariz. 85006 |
|---|---|---|
| [21] | Appl. No. | 864 |
| [22] | Filed | Jan. 6, 1970 |
| [45] | Patented | Aug. 10, 1971 |

[54] CAMPER BODY FOR TRUCKS
5 Claims, 5 Drawing Figs.

[52] U.S. Cl. .................................................. 214/515, 296/35 A
[51] Int. Cl. ................................................... B60p 1/64
[50] Field of Search ....................................... 214/515, 516, 517, 84; 296/35 A; 254/45

[56] References Cited
UNITED STATES PATENTS

| 1,921,605 | 8/1933 | Canfield | 214/515 |
| 2,129,340 | 9/1938 | Webber | 214/515 X |

*Primary Examiner*—Albert J. Makay

ABSTRACT: An easily removed camper body for trucks. This camper body includes a plurality of ball type wheels on its underside which when properly positioned upon the truck will seat themselves in with the rubber surfaced edge will cause the assembly to be weather proof. The camper body is also secured in place by straps. The camper body also includes a lever arrangement for unseating the ball type wheels in order to easily remove the camper body from the truck.

INVENTOR
LUROY A. ANDERSON

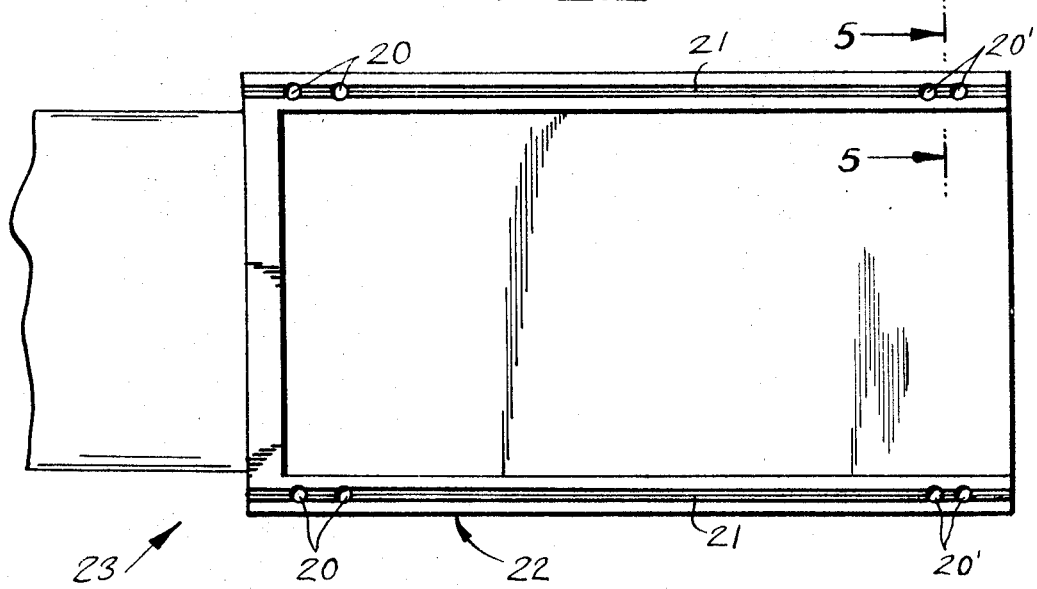
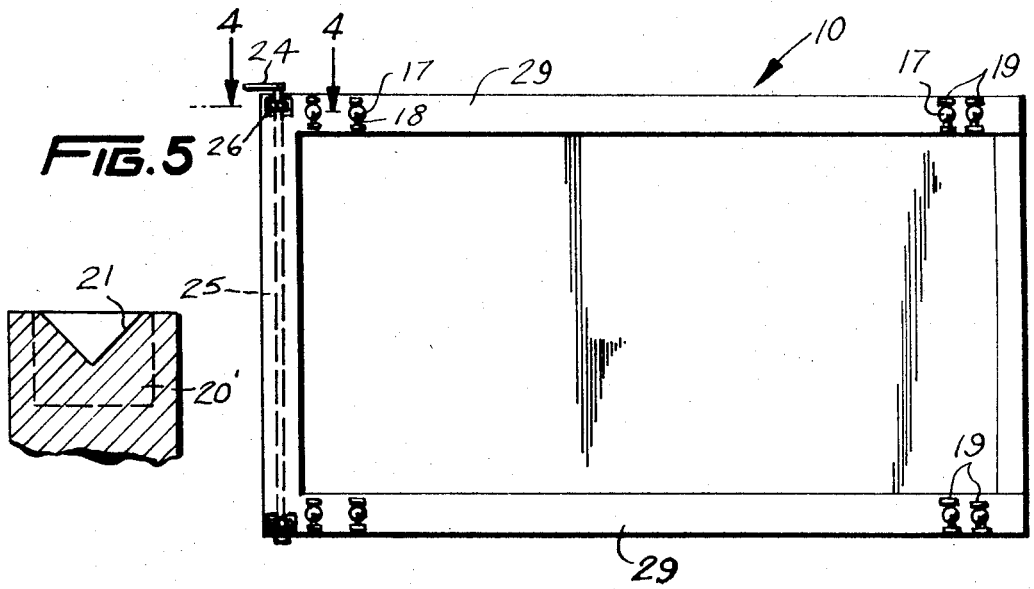

CAMPER BODY FOR TRUCKS

This invention relates to campers, and more particularly to a removable camper body for trucks.

It is therefore the primary purpose of the present invention to provide a camper body for trucks which will be easily removed or installed by one man, the camper body being of the shell type.

Another object of the present invention is to provide a camper body for trucks which will have a plurality of ball type wheels supported upon axle means on the underside of the camper body, the balls being seated upon trackings of the truck which will allow the camper body to be water tight through the use of a rubberlike gasket between the truck and the bottom side of the camper body.

A further object of this invention is to provide a device of the type described which will have lever and gear means to dislodge or unseat the ball-like wheels in order that the camper body may be easily removed from the truck.

A still further object of the present invention is to provide a device of the type described which will have securement means to render the camper body stationary upon the truck in order to prevent it from be dislodged by any winds.

Other objects of the present invention are to provide a camper body which is simple in design, inexpensive to manufacture, rugged in construction, easy to use and efficient in operation.

FIG. 2 is a fragmentary top plan view of the truck with the camper portion shown removed therefrom;

FIG. 3 is a view of the camper body taken along the line 3-3 of FIG. 1;

FIG. 5 is an enlarged cross-sectional view taken along the line 5-5 of FIG. 2.

Figure 1:
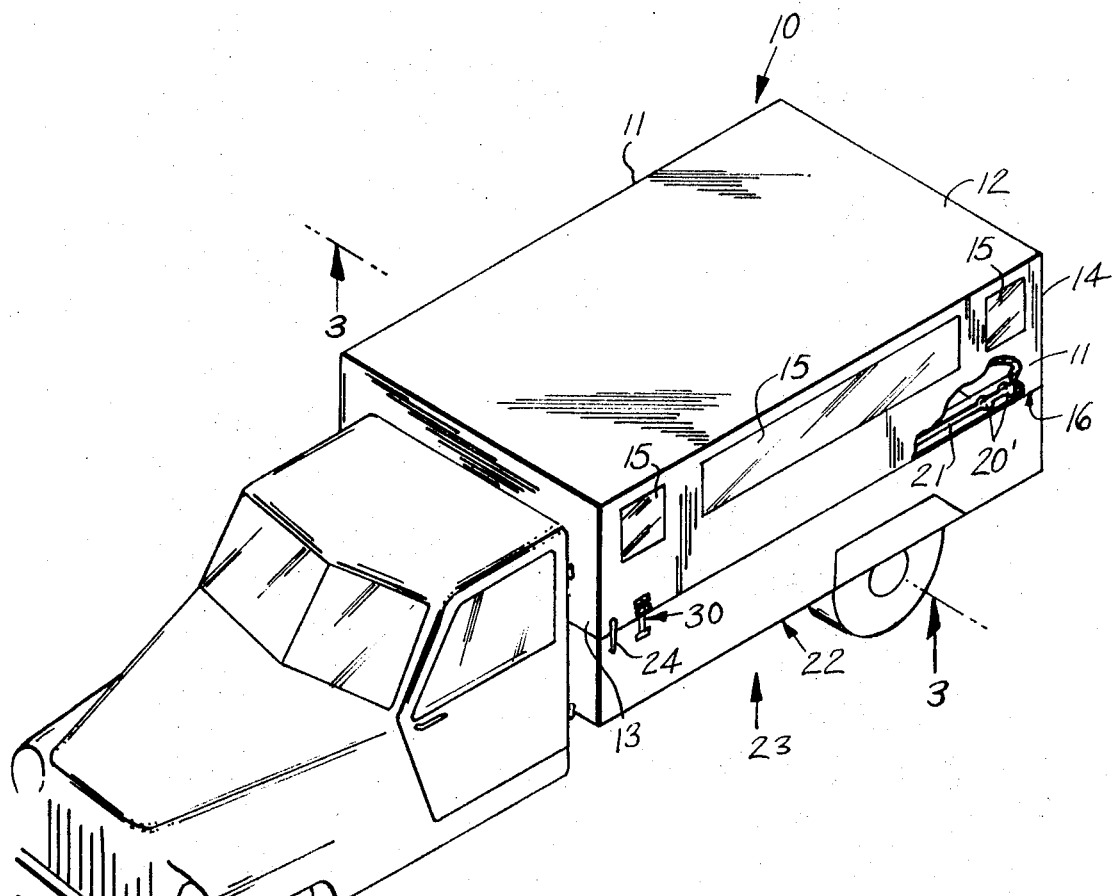
FIG. 1 is a perspective view of a camper body which is shown partly broken away.
Figure 4:
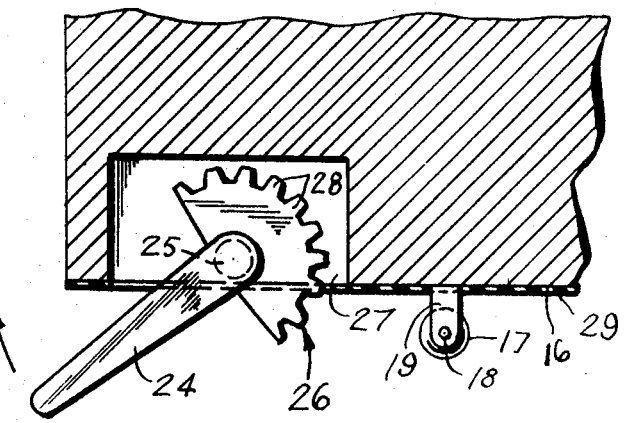
FIG. 4 is enlarged cross-sectional view taken along the lines 4-4 of FIG. 3.

According to this invention, a camper body 10 for trucks is shown to include parallel spaced apart sidewalls 11, a top wall 12, a front wall 13 and a rear wall 14 forming a removable shell. A plurality of windows 15 are included in the sidewalls 11 and suitable entrance means (not shown) is included in the rear wall 14. The lower edge 16 of camper body 10 is provided with a plurality of ball shaped wheels 17 which are rotatable upon shafts 18 secured within brackets 19, the brackets 19 being secured in a suitable manner to the edge 16 of camper body 10. A pair of spaced apart openings 20 and a pair of spaced apart openings 20' are in mutual alignment with a V-shaped track 21 on each side of the body 22 of truck 23 for a purpose which herein after will be described.

It is to be noted that the forward openings 20 are spaced further apart than those openings 20 prime at the rear of the body 10 in order that the ball shaped wheels 17 on the front of body 10 will not fall into the openings 20 prime when removing the body 10 from the truck 23.

In order to lift body 10 from truck 23 a rotatable lever 24 exterior of body 10 is secured fixably to an elongated shaft 25 extending across the front of body 10. To shaft 25 a lever 24 extends downwards therefrom and the gear 26 attached to shaft 25 is shared within the opening 27 of body 10 and the teeth 28 of gear 26 when lever 24 is rotated will engage upon shank 21 and will serve to camingly raise body 10 from body 22 of truck 23 in order that the wheels 17 will lift out of their openings 20 and 20' in order that the body 10 will be urged rearward of truck 23 and removed therefrom. When body 10 is being removed the wheels 17 after being dislodged from openings 20 and 20' they will engage the V-shaped track 21 so that body 10 will be smoothly urged rearwards and off of body 22 of truck 23.

It shall also be noted that a rubber gasket 29 when placed between body 10 and body 22 of truck 23 will cause camper body 10 to be weather proof and strap means 30 is used to secure body 10 in place upon truck 23.

It shall further be noted that when body 10 is placed upon truck 23 the wheels 18 will roll within the groove track 21 and then fall into their appropriate openings 20 and 20', the groove track 21 causing body 10 to be in continuous alignment when placing and removing it from truck 23.

It shall even further be noted that a similar type pair of tracks 21 may be used upon a stand when body 10 is out of service.

What I now claim is:

1. A removable shell type camper body for trucks, comprising a plurality of ball shaped front wheels for engaging openings in the front of the body of said truck, a plurality of ball shaped wheels carried at the rear of said camper body for engaging and seating openings in the rear portion of said body of said truck, mounting means carried by said wheels for attaching them to said camper body, V-shaped track means carried by the body of said truck for maintaining alignment of said wheels, shaft lever and gear means carried by said camper body for lifting and removing said camper body from said truck and strap means carried by said body for securing said camper body stationary.

2. The combination according to claim 1, wherein said body of said camper is shell like and to the underside is secured mounting brackets, said mounting brackets including axle means upon which said ball shaped wheels rotate and said ball shaped wheels engage the V-shaped track of the body of the truck carrying said camper body, the front openings in said body of said truck being spaced farther apart from the rear openings in the body of said truck in order to prevent the front ball shaped wheels of said camper body from engaging with the openings in the rear of said body of said truck when removing said camper body from said truck.

3. The combination according to claim 2, wherein said front and rear openings that seat said ball shaped wheels of said camper body are in mutual alignment with each other, said ball shaped wheels when lifted upwards by said gear, shaft and lever means will roll within said V-shaped track for quick and easy removal of said camper body from said truck.

4. The combination according to claim 2, wherein said shaft carrying said lever is rotatable within the forwardings of said camper body in a cavity provided therefore and a pair of sector gears secured fixable to said shaft carrying said lever are provided with piece means to engage with said body of said truck in order to cam said camper body upwards which will lift said ball shaped wheel from their associated openings in order that said balls will ride within said track in order to provide easy pulling for said camper body in order to remove said camper body from said body of said truck and a rubber gasket means on the underside of said camper body providing weather proofing when said camper body is in the loaded position on said truck.

5. A combination according to claim 4, wherein said strap are anchor strap means secured to said body of said truck providing a means of rendering said camper body stationary in high wind and said anchor strap means are secured to said body of said truck and are received in suitable bracket means on the exterior of said sides and front of said camper body.